April 25, 1967

M. J. KIRCHHOEFER 3,315,824

METHOD AND APPARATUS FOR CONTINUOUS GRAVITY
FEED OF FLUENT MATERIALS

Filed May 25, 1965

Martin J. Kirchhoefer
*INVENTOR.*

April 25, 1967  M. J. KIRCHHOEFER  3,315,824
METHOD AND APPARATUS FOR CONTINUOUS GRAVITY
FEED OF FLUENT MATERIALS
Filed May 25, 1965  2 Sheets-Sheet 2
Fig. 2
| Contact No. | V1 | V2 | V3 | V4 |
|---|---|---|---|---|
| 1 | C | C | O or C | C |
| 2 | Ox | C | O or C | C |
| 3 | Cx | C | C | C |
| 4 | C | C | C | Ox |
| 5 | C | Ox | C | O or Cx |
| 6 | C | Cx | Ox | C |
| 1 | C | C | O or C | C |
Fig. 3
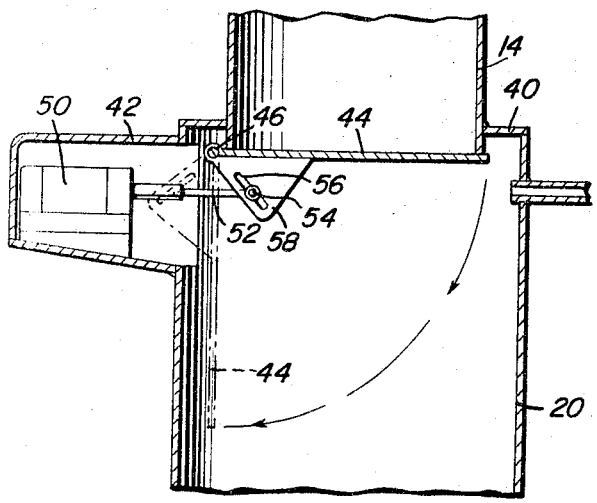
Fig. 4
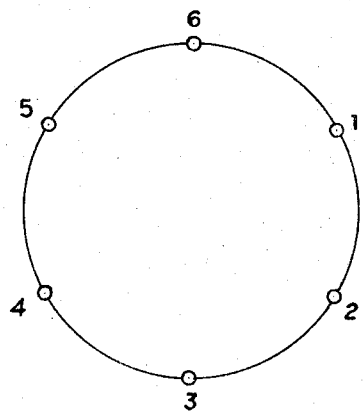
Martin J. Kirchhoefer
INVENTOR.
BY Clarence A. O'Brien
and Harvey B. Jacobson
Attorneys United States Patent Office 3,315,824
Patented Apr. 25, 1967

3,315,824
METHOD AND APPARATUS FOR CONTINUOUS
GRAVITY FEED OF FLUENT MATERIALS
Martin J. Kirchhoefer, Wisconsin Rapids, Wis., assignor to Pulpamac, Inc., a corporation of Wisconsin
Filed May 25, 1965, Ser. No. 458,556
7 Claims. (Cl. 214—17)

This application is a continuation-in-part of application Ser. No. 267,526 filed Mar. 25, 1963, now Patent No. 3,190,509.

This invention comprises a method for the continuous gravity feed of fluent materials and more particularly pertains to a method and also contains an apparatus for effecting the gravity feed of fluent materials from a relatively low pressure region or atmospheric source of supply into a sealed receptacle at an above atmospheric pressure or at a relatively higher pressure than that of the source of supply.

In many commercial processes and especially in that for obtaining cellulose pulp from wood chips and particles, it is desirable to effect a continuous and uninterrupted rate of flow of material into a receptacle sealed at an above atmospheric pressure and from which the material is supplied to apparatus for the performance of certain process operations upon the material.

It is therefore the primary purpose of this invention to provide a method and apparatus for efficiently carrying out the method, which will effectively enable fluent materials to be delivered from an atmospheric or relatively low pressure source of supply and will enable the material to be discharged in a continuous uninterrupted flow at a variably controlled rate into a receptacle at a relatively higher pressure and at the pressure within that receptacle.

A further purpose of the invention is to provide a method and apparatus in accordance with the preceding object which shall effectively introduce successive intermittent batches of material from the source of supply into a variable pressure pressurizing chamber, to therein raise the pressure from a source of low pressure supply to that of the high pressure receptacle and to intermittently supply the pressurized batches into a high pressure storage chamber and continuously and variably control the rate of delivery of the material from the storage chamber into the receptacle at the desired pressure of the latter.

Still another object of the invention is to provide a method and apparatus which will accomplish the above-mentioned objects and which shall be entirely automatic in operation.

A further object of the invention is to provide an apparatus in accordance with the foregoing objects wherein the automatically operable valving means between the various chambers shall be enclosed from the atmosphere and disposed within the chambers themselves.

A still further object of the invention is to provide an apparatus in conformity with the preceding objects which shall utilize a power operating means for the control valves such as fluid pressure actuators, solenoids or the like and wherein the valve control means may be all cyclically controlled by an automatic timing mechanism for effecting the relative valve operations in a proper sequence with the overall process.

Another and subordinate object of the invention is to provide a process and an apparatus whereby fluent materials from different sources of supply at relatively low pressures may be continuously supplied but in sequential intermittent batches into a relatively high pressure region or receptacle from whence the material from the combined separate sources may be continuously delivered in a constant flow but variable rate discharge to its ultimate destination.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a diagram illustrating the cyclic operation of certain of the control valves of the apparatus and method;

Figure 1:
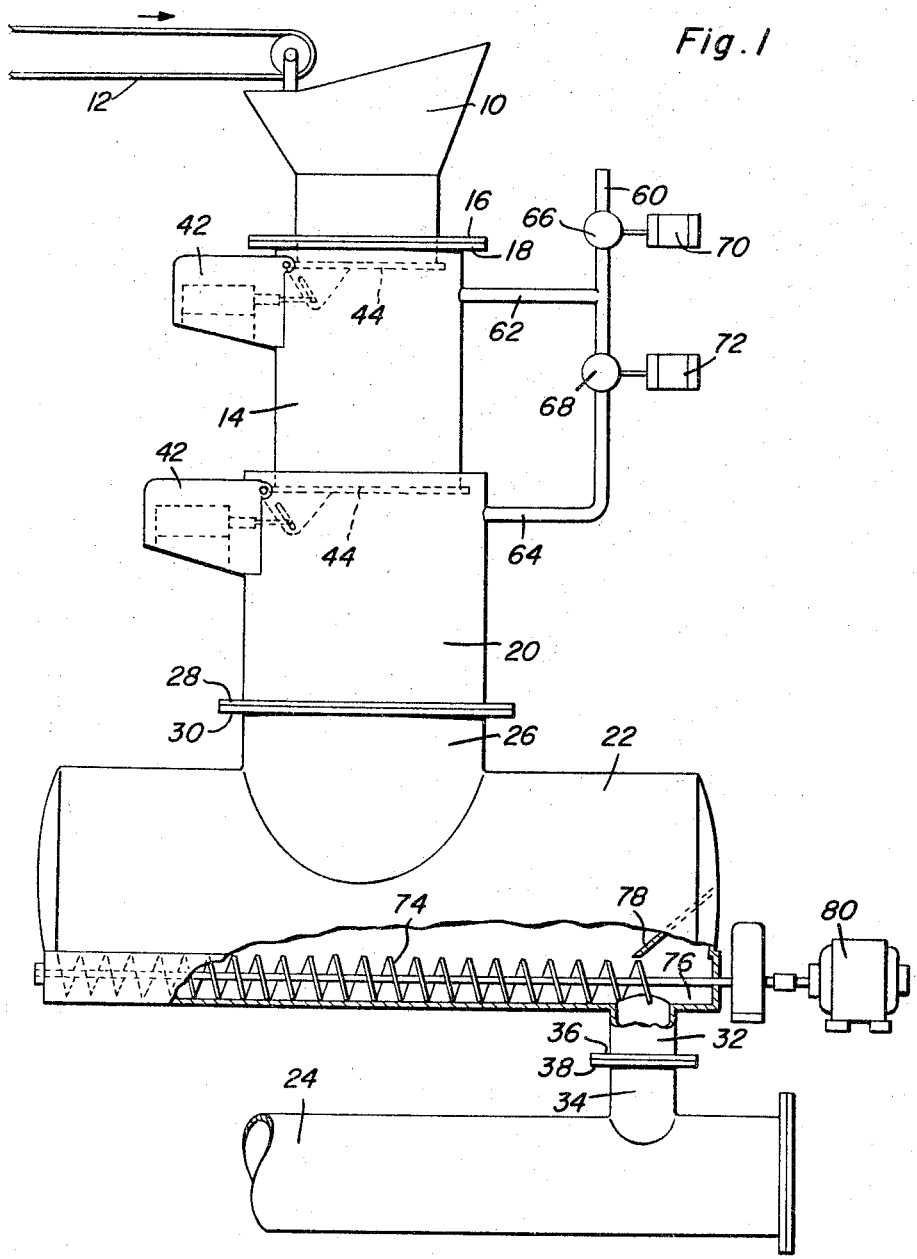
FIGURE 1 is a somewhat diagrammatic view showing partly in elevation and partly in vertical section a suitable form of apparatus in accordance with the principles of this invention.

FIGURE 3 is a detail view taken in vertical section and upon an enlarged scale of the connection poriton of two of the adjacent pressurized chambers of the apparatus together with the control valve and the control valve actuating means disposed therein, with the control valve being shown in closed position in solid lines and being shown in open position in dotted lines therein; and FIGURE 4 is a diagrammatic view showing the timed sequential operation of the control valves of the invention.

The invention disclosed in this application relates to an apparatus and method of the same general character as that set forth in my above-identified copending prior application, now Patent No. 3,190,509, issued June 22, 1965, and relates primarily to a method although also embodying novelty in a modified form of apparatus from that disclosed in my prior patent. The method herein disclosed is capable of being performed by various types of apparatus, as for example the apparatus specifically disclosed in my prior patent as well as the improved form of apparatus disclosed herein.

The method itself is generally adapted to the operations of supplying from a low pressure source fluent materials of various types into a relatively high pressure chamber and dispensing such materials from that high pressure chamber at a continuous but variably controlled rate. Specifically, the method of this invention is especially adapted to the operation of supplying wood chips or particles into a pulp digester.

The method set forth and claimed hereinafter comprises the steps of:

(1) Delivering a fluent material such as wood chips in either a continuous or in a separate and sequential independent batch manner from any suitable source and at a relatively low pressure such as atmospheric pressure into the hopper, bin, chamber or region of low pressure;

(2) Intermittently delivering batches of the material from the low pressure region into an intermediate or variable pressure region or chamber which is sealed from the atmosphere by intermittent outlet valve means automatically operated;

(3) Raising the pressure within the variable pressure chamber or region and then delivering batches of the pressurized material therein into a high pressure region or chamber which is likewise sealed from the atmosphere and wherein a continuous desired high pressure is maintained;

(4) Storing the material under the said high pressure in a reservoir or storage chamber of the high pressure region or chamber;

(5) Feeding the material from the storage chamber or reservoir at a variably controlled but continuous rate into a dispensing chamber at the same high pressure for subsequent use of the material.

In carrying out this method the invention comprehends such practical expedients as delivering the material into the low pressure region, hopper, bin or chamber from a plurality of different sources either at a continuous rate, whether variable or constant, or in the form of variably timed intermittent batches; or delivering the material in batches from a plurality of low pressure hoppers, regions, bins or chambers into one or more intermediate or variable pressure regions or chambers, from the latter, whether one or more into the high pressure region or chamber.

The method further envisions the provision of the various control valves establishing communication between the different chambers within the chambers themselves in order to adequately seal the chambers from the atmosphere and to enclose the valve operators, and to effect a power operation of the various control valves in an automatic, cyclically timed manner.

The method set forth herein and claimed hereinafter is capable of being carried out by the apparatus set forth in my prior patent. However, disclosed herein in a manner to be now described, is an improved preferred form of apparatus for carrying out this method.

The apparatus shown in FIGURE 1 of the drawings is diagrammatically illustrated as comprising a hopper, bin or chamber 10 comprising a low pressure region and which as illustrated may be open to the atmosphere for receiving the fluent material. The latter is delivered to the hopper or low pressure region as by a conventional type of conveying means 12 from any suitable source. As previously mentioned, the conveying means may be either continuously operated to effect a constant and either fixed or variable rate of delivery of the material to the hopper or may comprise any other means for delivering intermittently batches of the material into the hopper as required.

Supporting the hopper and disposed thereneath is an intermittent or variable pressure region or chamber 14 which may be detachably secured to and support the hopper 10 as by means of cooperating detachably connecting mounting flanges 16 and 18. The variable pressure chamber 14 is sealed from the atmosphere except for the controlled inlet, outlet and vent means described hereinafter, and in turn is mounted upon and supported by the lower member 20, see also FIGURE 3, which constitutes the upper portion or inlet into a high pressure region consisting of a storage or reservoir chamber 22 and a lower dispensing chamber 24. The chamber 24 is preferably a part of or is the processing apparatus being fed by the device. The members 20, 22 and 24 constitute a high pressure region or chamber wherein the same elevated pressure, is continuously maintained. It will now be understood that the variable pressure chamber 14 varies in pressure cyclically and alternately between the relatively low pressure of the hopper 10 and the fixed relatively high pressure of the high pressure region as defined in the inlet means or chamber 20, the storage or reservoir chamber 22 and the dispensing chamber 24.

The variable pressure chamber 20 may likewise be detachably secured to the upstanding neck 26 from the inlet to the storage chamber or reservoir 22 as by means of their cooperating detachably connected mounting flanges 28 and 30. The storage or reservoir chamber 22 likewise is provided with a depending discharge neck 32 which in turn is attachably coupled to the upstanding inlet neck 34 of the dispensing chamber 24 as by a pair of cooperating detachably connected mounting flanges 36 and 38. Inasmuch as the actual details of construction of the mounting flanges disclosed may be of any suitable and conventional design and in themselves not critical of or to the invention disclosed and claimed herein, a further description thereof is deemed to be unnecessary, it being sufficient to note that each of the chambers 14, 20, 22 and 24 are intended to be sealed from the atmosphere during their normal operation.

Referring particularly to FIGURE 3, it will be observed that the lower end of the wall member of the variable pressure chamber 14, extends through and is sealingly secured to the top wall 40 of the inlet chamber 20.

Each of the chambers 14 and 20, preferably closely adjacent their junction with the hopper 10 and the chamber 14, respectively, is provided with housings or enclosing casings each indicated by the numeral 42 since these casings and the associated structure inside are substantially identical. Preferably these casings provide lateral projections of their respective casings 14 and 20 which have free continuous communication with the interior thereof, and are disposed closely adjacent but beneath the immediately overlying chambers 10 and 14. As indicated in dotted lines in FIGURE 1, the discharge end of the hopper 10 likewise extends through and into the chamber 14 immediately thereneath. The inwardly extending portions of the chamber 10 and 14 are each provided with a closure or control discharge valve therefrom which comprises an inlet valve for the immediately adjacent lower chamber, this valve being preferably of the plate valve type and is designated by the numeral 44. A suitable pivotal connection 46 mounts this valve upon either the wall of the chamber in which it is disposed or upon the inwardly projecting end of the chamber immediately thereabove.

In any event, the control valve is movable by a power operated automatically timed control means as set forth hereinafter between a substantially horizontal position shown in full lines in FIGURE 3 and in dotted lines in FIGURE 1 in which it closes the lower or discharge end of its associated chamber or, under the influence of gravity and its power operating means to a dotted line position shown in FIGURE 3 in which it provides a full and free communication between the associated chambers.

It will be appreciated that if desired the valve may be counterbalanced so that it will readily open under the influence of gravity when the pressure between the two chambers is equalized. However, it is deemed preferable to provide a power operating means for positively effecting the opening and closing movement of the valve.

This power operated means may consist of electrical solenoids as set forth in the apparatus disclosed in my above mentioned patent. However, it is preferred to provide fluid pressure actuated motors or operators indicated at 50 and which are of any suitable type and are supplied with an operating fluid under pressure, from any suitable source, and by a means not shown, and which motors include piston rods 52 having a slidable pivotal connection 54 with a connecting slot 56 disposed in brackets or lugs 58 fixedly secured to the closure valves 44. Preferably the motors and their piston rods 52 are disposed horizontally and are so positioned that the fluid motors and their piston rods will be recessed or retracted into the housings or casings 42 when the valve 44 is in open position thereby permitting full opening movement of the valves. The closure valves and the operating means are identical for the two chambers 14 and 20.

A conduit 60 whose open upper end communicates with the atmosphere has a pair of branches 62 and 64 each of which communicates continuously with the interior of the chambers 14 and 20, respectively. Control valves 66 and 68, each operated by power actuators such as fluid pressure motors 70 and 72, respectively, are provided in the conduit 60 upon the opposite sides of the branch conduit 62 for a purpose and operation to be subsequently set forth.

Referring now particularly to the chamber 24, it will be understood that this chamber communicates directly with some other apparatus such as a pulp digester or the like and to which suitable connections supply and maintain the constant fixed relatively high pressure therein. This high pressure of course, communicates with and is likewise simultaneously applicable to the interior of the dispensing chamber 22 and the reservoir or storage chamber 20. When the valve 44 connecting the chambers 14 and 20 is opened, the pressure is likewise applied to the interior of the variable pressure chamber 14 and equalizes the pressure of the latter at the same desired fixed relatively high pressure.

It may be herein noted that when the valve 44 between the chambers 14 and 20 is closed, and the corresponding valve is open between the chambers 10 and 14, the pressure of the chamber 14 will be or becomes identical with that of the chamber 10 and at which pressure fluent material is supplied.

The storage chamber 22 communicates with the dispensing chamber 24 through the above-mentioned connected necks or conduits 32 and 34. A dispensing means consisting of an auger screw or conveyor 74 is suitably mounted in a sump portion 76 in the bottom of the chamber 22 and serves to positively feed material longitudinally of the chamber 22 to the discharge conduit 32. A baffle 78 appropriately disposed in the chamber 22 overlies the opening into the conduit 32 and that portion of the auger screw 74 which extends across the opening to prevent the direct flow of material thereto but only allow flow of material into the conduit 32 under the influence of the rotating auger screw 74.

The auger screw 74 itself is powered as by an electric motor 80 of any suitable type and by any suitable control means, not shown, so as to thereby effect a positive displacement and at an adjustably controlled rate of the material into the dispensing chamber 24.

As so far disclosed, it is to be understood that the influence of gravity is relied upon to effect a flow of fluent material from the conveying means 12 into the low pressure region or hopper 10, from the latter to the corresponding control valve into the variable pressure chamber or region 14 and again from the latter through the appropriate control valve into the high pressure inlet chamber 20 and thus into the high pressure region consisting of the chambers 20, 22 and 24.

Any suitable automatically operating timing means, not shown, may be employed for cyclically operating in the proper sequence and for the proper length of time or duration the various automatically operated valves 44, 44, 66 or 68 of this invention in the manner indicated diagrammatically in FIGURES 2 and 4.

If these control valves are solenoid operated, then the contacts 1–6 of FIGURE 4 and referred to in FIGURE 2 will consist of electrical contact elements. On the other hand, when fluid pressure is employed as the motive force for the valves, the contacts 1–6 will consist of suitable port arrangements in distributing valve elements. Inasmuch as the actual structure of the control means whether an electrical distributing switch or a control valve in themselves are not critical to this invention and form no part of the invention claimed herein, but may be of any suitable well known design, a further description thereof is deemed to be unnecessary.

In the accompanying chart, the letter C indicates that the control member whether a contact or valve port is closed, the letter O indicates that it is open or in an operative position and the subscript X indicates that there is a change to the indicated position during that cycle of the operation.

The valve indicated at V–1 refers to the valve operator 50 of the valve 44 controlling communication between the hopper 10 and the variable pressure chamber 14. That indicated at V–2 corresponds to the operator 50 of the valve 44 which controls communication between the variable pressure 14 and the high pressure chamber 20. The label V–3 designates the valve 66 and its operator 70 which through branch conduit 62 and the venting conduit 60 periodically vents the interior of the chamber 14 to the atmosphere. Finally, the valve 68 and its operator 72 are designated by the label V–4, which through the conduit 60 and branch conduits 62 and 64 places the variable pressure chamber 14 under the relative high pressure of the high pressure region composed of the chambers 20, 22 and 26.

It will thus be apparent that the apparatus operates in the following method and performs the method as set forth and claimed herein as follows:

It is to be understood that when the apparatus is shut down, as for repairs, both of the valves 66 and 68 may be arbitrarily opened, thereby venting all of the chambers to the atmosphere. However, during normal operation, it is usually preferable that a minimum quantity of material be maintained at all times in each of the chambers 10, 14 and 22.

With the chambers charged and the apparatus ready for operation, the controller at the position 1 of FIGURES 2 and 4 may be considered as initiating the cycle of operation. In this position, all four valves will be closed, although it is immaterial whether the vent valve V–3 (66) is opened or closed. The conveyor 12 is now charging or replenishing the chamber 10.

When the controller moves to position 2, the valve V–1 opens, the other valves remaining unchanged from their previous positions, the valve 44 of the chamber 10 (V–1) under the weight of the batch of material thereon when its actuator 50 is deenergized or is positively opened by its actuator or both. A batch of material is now transferred from the hopper 10, at low pressure, into the variable pressure chamber 14 which also is at low pressure by the previous opening of the vent valve V–3 (66).

At the position 3, the controller now closes the chamber 14 from chamber 10 by the closing of the valve 44 between the two chambers (V–1). If not previously closed, the vent valve V–3 (66) is also now closed sealing the chamber 14.

At position 4, pressurizing of the sealed intermediate chamber 14 begins with the opening of valve V–4 (68) thereby applying the fixed high pressure of chambers 20, 22 and 24 to the chamber 14 through conduits 64, 60 and 62.

In position 5, the pressurized batch in chamber 14 is discharged into chamber 20 by opening the connecting valve 44 between the chambers 14 and 20 (V–2). This discharge may be facilitated by the pressurizing valve V–4 (68) remaining open, although this valve may now close if desired.

At position 6, after the pressurized batch of material has been introduced into the high pressure region, the chamber 14 is again shut-off therefrom by closing the valve 44 (V–2). Anytime after the valve V–2 has closed the chamber 14 can now be vented through the vent valve V–3 (66) to de-pressurize it in readiness to receive the next batch or change from the low pressure region 10.

The cycle of operation is now ready to repeat.

From the storage or reservoir chamber 22 of the high pressure region it will be appreciated that the material is discharged, under the still maintained high pressure by means of the dispensing auger 74 at adjustably regulated rates under the control of the motor 80 and any suitable control means and in a positive flow into the dispensing chamber 24 and thus in a continuous stream into the apparatus for subsequently treating or using the material.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A method for supplying fluent material received from a relatively low pressure source in a continuous stream at a controlled rate and while maintained under a relatively high pressure which comprises the steps of
   (a) withdrawing in intermittent batches from a low pressure region fluent material which is under a relatively low pressure,
   (b) transferring the withdrawn batches while under said relatively lower pressure intermittently into a confined region of variable pressure when the latter it at said relatively low pressure, (c) while said batches of material are confined therein, raising the pressure of said variable pressure region to said relatively high pressure, (d) transferring batches of material successively from said variable pressure region while the latter is under said relatively high pressure to a high pressure region which is maintained continuously under said relatively high pressure, (e) withdrawing fluent material in a continuous stream from said high pressure region while maintaining said relatively high pressure upon said stream of material and in said high pressure region.

2. The method of claim 1 wherein the step of intermittently introducing batches of fluent material into said high pressure region is effected at a rate which is independent of said rate of withdrawal of said stream of material from said high pressure region.

3. The method of claim 1 wherein said low pressure region is unconfined and is at atmospheric pressure.

4. The method of claim 1 wherein the step of withdrawing said continuous stream of fluent material from said high pressure region is effected by a controlled and variable rate of withdrawal without interruption of the continuous stream.

5. An apparatus for supplying a continuous stream of fluent material under a relatively high pressure from fluent material obtained in successive batches from a source of material under a relatively low pressure which comprises a low pressure chamber and a high pressure chamber with a variable pressure chamber interposed therebetween and disposed for successive movement of fluent material therethrough, a first and second valve means disposed respectively in said variable pressure chamber and in said high pressure chamber and controlling flow into and out of said variable pressure chamber, first and second operating means each connected respectively to and operating one of said first and second valve means, control means connected to said operating means and cyclically controlling their actuation of said first and second valve means, and control means in said high pressure chamber for effecting a continuous, uninterrupted and variable rate of flow of fluent material from said high pressure chamber.

6. The apparatus of claim 5 wherein said control means for effecting a continuous rate of flow from said high pressure chamber comprises a discharge area in said high pressure chamber, a material conveyor mounted within said high pressure chamber and discharging in said discharge area, and means for regulating the speed of said conveyor.

7. The apparatus of claim 6 wherein said material conveyor comprises a rotatably driven feed auger, the discharging end of which overlies said discharge area.

References Cited by the Examiner
UNITED STATES PATENTS

| | | | |
|---|---|---|---|
| 2,705,080 | 3/1955 | Hicks | 214—17 |
| 2,858,212 | 10/1958 | Durant et al. | |
| 2,912,126 | 11/1959 | Alspaugh et al. | 214—17 |

GERALD M. FORLENZA, *Primary Examiner.*

ROBERT G. SHERIDAN, *Examiner.*